(12) United States Patent
Preti et al.

(10) Patent No.: US 7,832,546 B2
(45) Date of Patent: Nov. 16, 2010

(54) STAR WHEEL

(76) Inventors: Fabrizio Preti, c/o Simonazzi S.p.A. Via La Spezia, 241/A, Parma (IT) I-43040; Massimiliano Barbieri, c/o Simonazzi S.p.A. Via La Spezia, 241/A, Parma (IT) I-43040; Paolo Madoi, c/o Simonazzi S.p.A. Via La Spezia. 241/A, Parma (IT) I-43040

( * ) Notice: Subject to any disclaimer, the term of this patent is extended or adjusted under 35 U.S.C. 154(b) by 0 days.

(21) Appl. No.: 12/298,039

(22) PCT Filed: Apr. 28, 2006

(86) PCT No.: PCT/IT2006/000299
§ 371 (c)(1),
(2), (4) Date: Jan. 30, 2009

(87) PCT Pub. No.: WO2007/125553
PCT Pub. Date: Nov. 8, 2007

(65) Prior Publication Data
US 2009/0218195 A1    Sep. 3, 2009

(51) Int. Cl.
*B65G 37/00*    (2006.01)
(52) U.S. Cl. .................................. 198/473.1; 198/480.1
(58) Field of Classification Search .............. 198/473.1, 198/480.1, 478.1, 479.1, 481.1
See application file for complete search history.

(56) References Cited

U.S. PATENT DOCUMENTS

| | | | | |
|---|---|---|---|---|
| 3,599,780 A | * | 8/1971 | Sorbie | 198/473.1 |
| 5,056,650 A | | 10/1991 | Kronseder | |
| 5,082,105 A | * | 1/1992 | Tincati | 198/473.1 |
| 5,373,934 A | * | 12/1994 | Jackson et al. | 198/480.1 |
| 5,533,608 A | | 7/1996 | Adams et al. | |
| 5,582,285 A | | 12/1996 | Kronseder | |
| 5,784,857 A | * | 7/1998 | Ford et al. | 198/473.1 |
| 5,826,400 A | | 10/1998 | Martin et al. | |
| 7,273,144 B2 | * | 9/2007 | Guernieri et al. | 198/480.1 |
| 7,497,322 B2 | * | 3/2009 | Lanfranchi | 198/473.1 |
| 2002/0081189 A1 | | 6/2002 | Giometti | |

FOREIGN PATENT DOCUMENTS

DE    10 2005 002510    7/2006

* cited by examiner

*Primary Examiner*—James R Bidwell
(74) *Attorney, Agent, or Firm*—Shoemaker and Mattare

(57) ABSTRACT

A star wheel for a bottle-processing machine, such as a filling machine, labeling machine or the like, includes a support fixed to a motor shaft and a wheel that is removably fixed to the support. The wheel has a base and a handling ring for the bottles, the handling ring being removably fixed to the base. The handling ring includes a primary sector and a removable sector which can be assembled with the primary sector.

2 Claims, 4 Drawing Sheets

STAR WHEEL

The present invention relates to a star wheel for bottle-handling machines, such as filling machines, labelling machines and the like.

Star wheels are normally used in those machines in which bottles are moved, particularly rotary machines.

Star wheels consist of a wheel with notches formed on the outer periphery thereof, which engage a part of the bottle and contribute to draw the same along circular paths, in order to move the bottles from a processing station to the next station.

The size of the star wheel is dictated by the number of bottles to be moved per unit time. It is thus obvious that star wheels are relatively large-sized. The bulk of a star wheel, in some cases, is a considerable problem. It is known, in fact, that in beverage bottling plants, such as for beer, the various parts of the machine require to be periodically washed and sterilized, including the star wheels, as they come in direct contact with the bottles to be filled. This operation is preferably carried out using washing machines in which the piece is introduced in order to be washed and sterilized. Because of the considerable bulk of star wheels, it is often impossible to introduce a star wheel in these washing machines, thus resulting in a consequent increase in the time and cost required for the sanitization of the piece.

The problem at the heart of the present invention is thus to provide a star wheel, which solves the drawbacks related to the bulk thereof.

This problem is solved by a star wheel for container-conveying machines, such as set forth in the annexed claims.

Further features and advantages of the star wheel being the object of the present invention will be better understood from the description of an exemplary embodiment thereof, which is given below by way of non-limiting illustration, with reference to the following figures.

Figure 1:
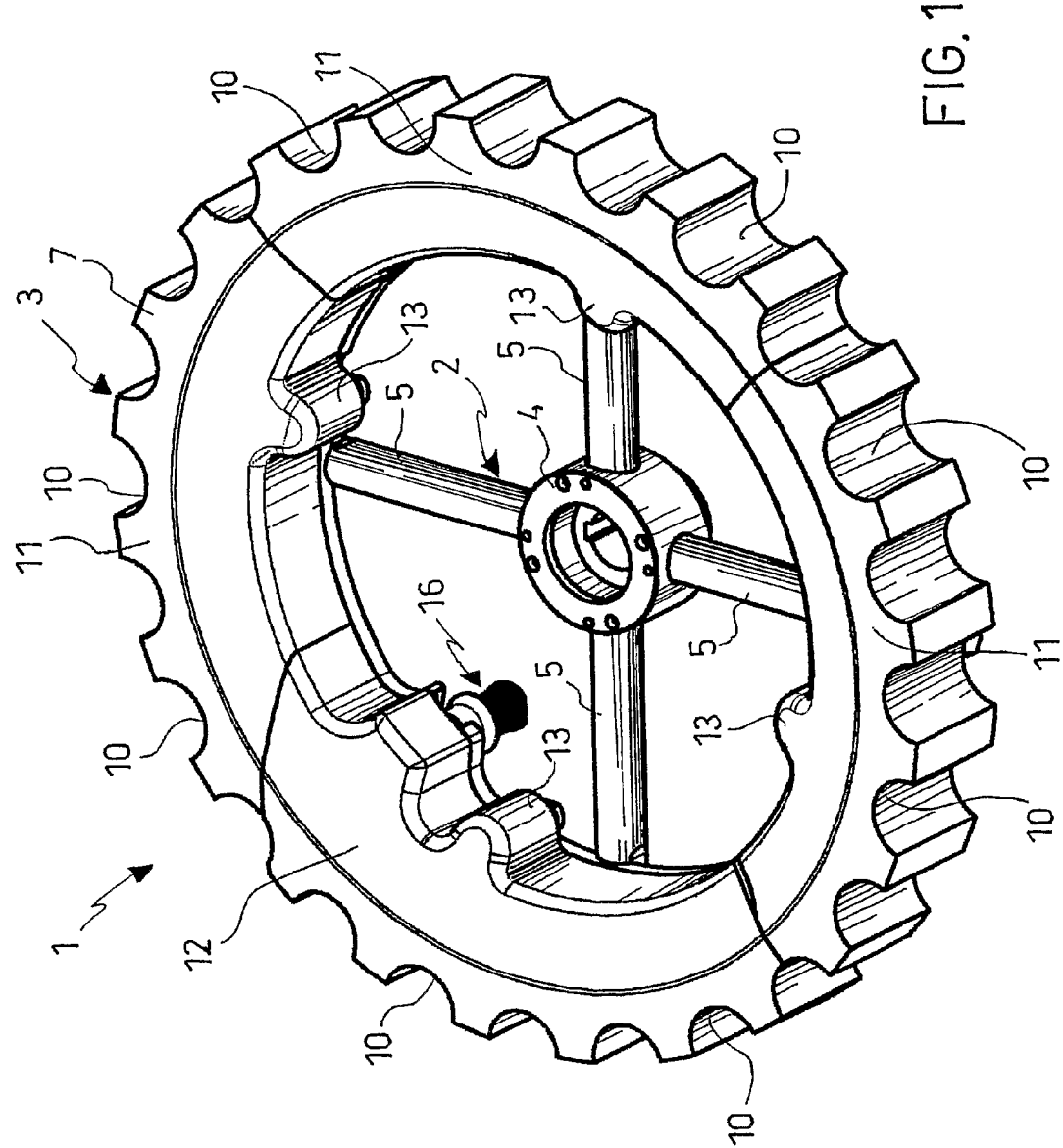
FIG. 1 shows a perspective view of the star wheel according to the invention.

With reference to the figures, the star wheel 1 comprises a support 2, particularly a spoked support, to which the wheel 3 is removably fixed.

The spoked support 2 comprises a hub 4 from which there starts a plurality of spokes 5. The spokes 5 may either have a round section (such as in the example) or a different section. The hub 4 will be fixed to the shaft of a suitable motor drive (not shown) for moving the star wheel.

The wheel 3 comprises a base 6 to which a handling ring 7 for the containers is removably fixed, as will be described below.

The base 6 of the wheel 3 is removably fixed to the spoked support 2 by means of suitable stop means 8, in the example, these are setscrews being fitted in the head of the spokes 5 and by means of suitable stop means 9 (washers, plates or the like) they urge on the side edge of the base 6, thereby holding the latter in position. Thereby, by loosening the stop means 8, the wheel 3 can be timed and then locked in the position corresponding to this timing by tightening the stop elements 8.

The handling ring 7 for the containers has generally a circular shape, a plurality of notches 10 being provided on the outer periphery thereof in a number corresponding to the containers to be moved, said notches being intended to interact with the surface of the container during the handling and moving steps.

The handling ring 7 is divided into at least one primary sector 11 and a fixing sector 12, which can be assembled as will be described below. In the example shown in the figures, there are three primary sectors 11 and a fixing sector 12.

Each one of the primary sectors 11 has the shape of an arc of circle, and comprises a projection 13 facing the inside of the wheel 3 along the periphery thereof. On the downward-facing surface of the primary sector 11, which is intended to be coupled to the base 6 there is arranged a plurality of stop pins 14, which are substantially mushroom-shaped. One of these stop pins 14 is arranged at the projection 13.

The fixing sector 12, which has also the shape of an arc of circle, in addition to comprising said projection 13, along the inner periphery thereof, also comprises a second projection 15. The first projection 13 may also be omitted. On the downward-facing surface, which is intended to be coupled to the base 6, the fixing sector comprises a stop pin 14, and a second stop pin 14 being also comprised in the event that the projection 13 is provided.

The junction edge between the fixing sector 12 at the end proximate to the anchoring pin 16, and the primary sector 11 bordering thereon, is not arranged in a radial manner, unlike the other sectors, but it is skew. Particularly, the end of the fixing element 12 will be more prominent at the inner periphery and recessed at the outer periphery, such as to substantially adopt a shark-tooth shape. The end of the adjoining primary sector 11 will be, of course, complementary thereto.

Below the second projection 15, the fixing sector 12 comprises an anchoring pin 16. The anchoring pin 16 comprises a fixed pin element 17, a tubular movable element 18 coaxially sliding thereon, a shoulder 19 being provided at the outmost end thereof. The fixed pin element 17 comprises, in turn, a mushroom-shaped head. A spring 20 is held between the mushroom-shaped head of the pin element 17 and the shoulder 19 of the movable element 18.

The base 6 comprises a plurality of bulb-shaped slots 21, the portion thereof having the largest diameter is as large as to allow the head of the stop pins 14 to pass therethrough. The slots 21 are arranged at said stop pins 14, such that in the step of assembling the star, the pins 14 are aligned with the largest portion of the slots 21.

Figure 2:
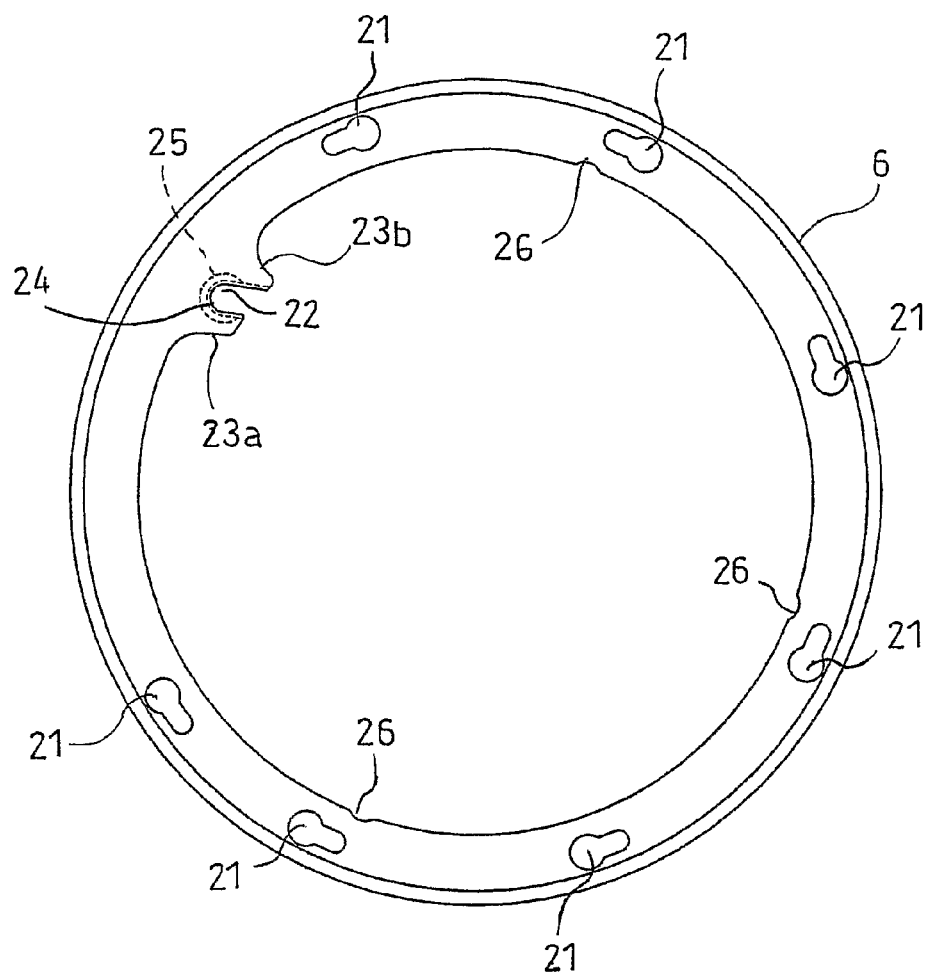
FIG. 2 shows a plan view of a detail of the star wheels from FIG. 1.
Figure 5:
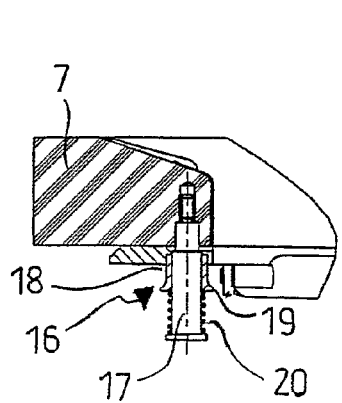
FIG. 5 is a view according to the section V-V from FIG. 3 of a different detail of the fixing system for the star wheel of the invention.
Figure 4:
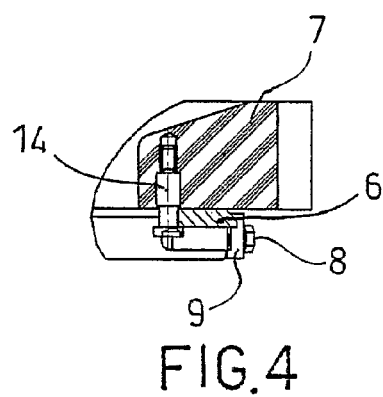
FIG. 4 is a view according to the section IV-IV from FIG. 3 of a detail of the fixing system for the star wheel of the invention.
Figure 3:
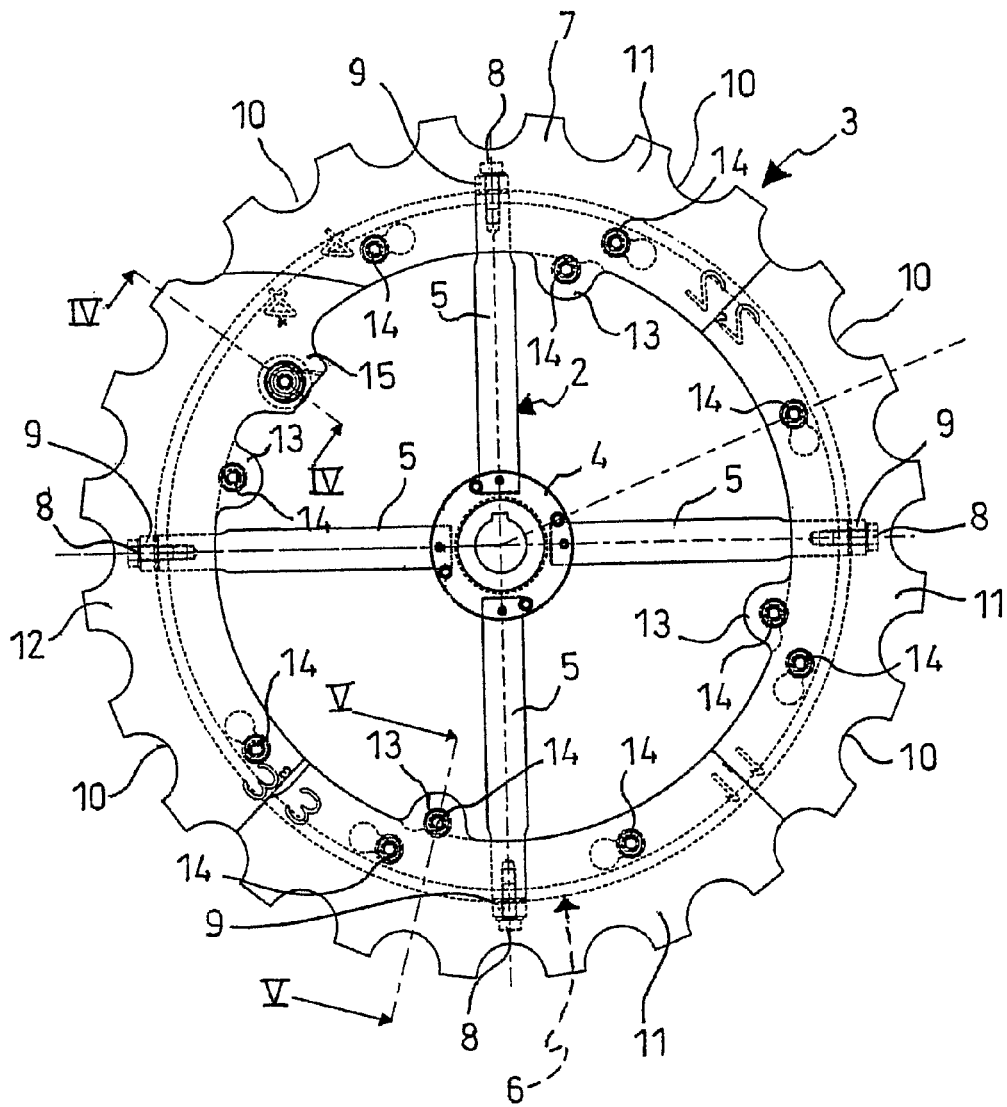
FIG. 3 shows a plan view in phantom of the star wheel of the invention.
Figure 6:
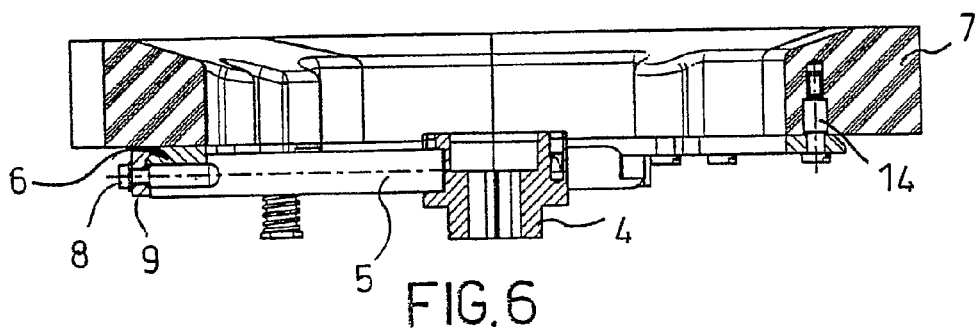
FIG. 6 shows a sectional view of a detail of the star wheel of the invention.
Figure 7:
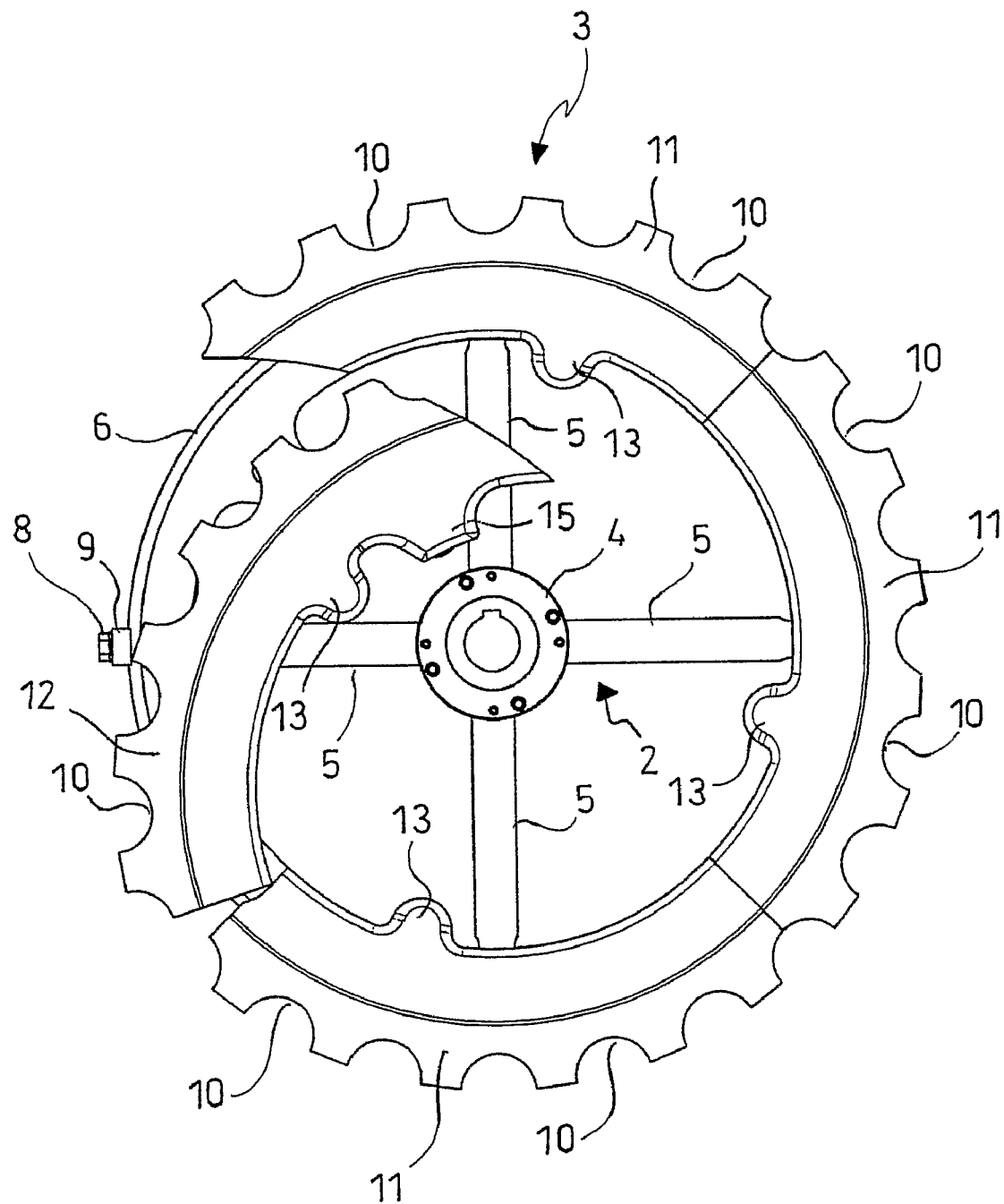
FIG. 7 is a plan view of the star wheel of the invention during the assembly step.

The base 6 further comprises, along the downward-facing periphery thereof, a seat 22 for the anchoring pin 16. This seat 22 is formed by two projections 23a, 23b and comprises an upper portion 24 having a width substantially corresponding to the diameter of the fixed pin element 17, or slightly larger thereof, and a lower portion 25 (shown in a dotted line in FIG. 2) having a width or diameter substantially corresponding to the diameter of the movable element 18.

Furthermore, the base 6 comprises a plurality of recesses 26 arranged at the stop pins 14 that are fixed below the projection 13 of the primary sectors 11 and in alignment with the latter during the step of assembling the star.

The assembly of the primary sectors 11 and fixing sector 12 is carried out as follows.

After the base 6 has been timed on the spoked support 2, and has been locked thereto as described above, a first primary sector 11 is rested on the base 6 by fitting the stop pins 14 within the largest-diameter portion of slots 21 and by aligning the stop pin 14 arranged at the projection 13 with the relative recess 26. When the sector is rotated such that the stop pins 14 are fitted within the smallest portions of the relative slots 21, the primary sector 11 is removably secured, By means of this operation, the stop pin 14 being arranged at the projection 13 will be misaligned with the recess 26 and thus will urge against the edge of the base 6, thereby contributing to the securing action.

The same procedure is applied to the other primary sectors 11. On the other hand, the fixing sector 12 will be assembled by fitting the pin 14 within the slot 21 while maintaining the opposite end of the sector facing the inside of the star. When the movable element 18 of the anchoring pin 16 is held in the backward form (forward with the head of the fixed pin element 17), the sector 12 is rotated counter-clockwise about the stop pin 14 that is already fitted in the matching slot 21, so that the anchoring pin 16 is fitted within the seat 22. When the movable element 18 is released, the latter, which is biased by the spring 20, urges on the joining step between portion 24 and portion 25 of the seat 22, thereby providing to anchor the sector 12.

By operating in reverse, the star will be disassembled.

The embodiment as described above resolves the problem set forth herein, as it makes it possible to disassemble the star wheel into small-sized pieces, which can be easily inserted within the washing machines used to the purpose.

It will be appreciated that only a particular embodiment of the star wheel being the object of the present invention has been described herein, to which those skilled in the art will be able to make any and all modifications necessary for its adjustment to specific applications, without however departing from the scope of protection of the present invention.

The invention claimed is:

1. A star wheel for a container-handling machine having a motor-drive means, said star wheel comprising
    a support which can be fixed to a shaft of the motor-drive means and
    a wheel which is removably fixed to said support, said wheel comprising a base and a handling ring for the containers, said handling ring being removably fixed to said base,
    wherein said handling ring of the containers is divided into at least one primary sector and a fixing sector which can be removably assembled with the primary sector,
    wherein said fixing sector is shaped as an arc of circle and comprises a projection, in which, on the downward-facing surface may be coupled with said base, said fixing sector comprises a stop pin which may be coupled with only one of said base and an anchoring pin being arranged below said projection, which anchoring pin may be coupled with a seat arranged along the periphery of said inward-facing sector.

2. The star wheel according to claim 1, wherein said at least one primary sector has the shape of an arc of circle and comprises, on the downward-facing surface thereof, a plurality of stop pins which may be coupled with corresponding slots arranged on said base.

\* \* \* \* \*